Patented July 7, 1925.

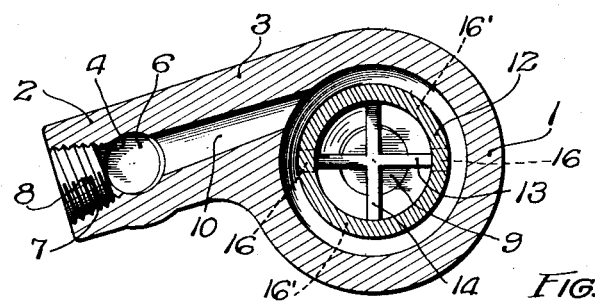
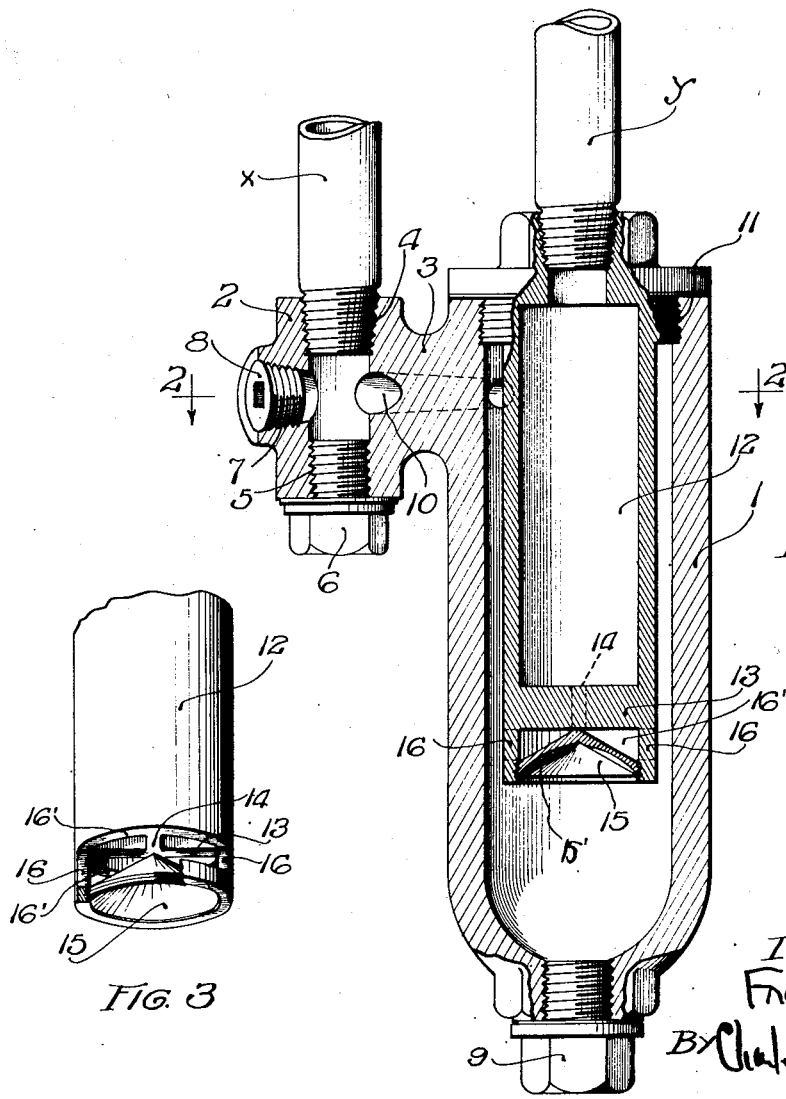

1,544,981

UNITED STATES PATENT OFFICE.

FRANK CLARENCE HASSE, OF LA GRANGE, ILLINOIS.

DUST AND DIRT COLLECTOR.

Application filed September 30, 1924. Serial No. 740,860.

*To all whom it may concern:*

Be it known that I, FRANK C. HASSE, a citizen of the United States, residing at La Grange, in the county of Cook and State of Illinois, have invented certain new and useful Improvements in Dust and Dirt Collectors; and I do hereby declare the following to be a full, clear, and exact description of the invention, such as will enable others skilled in the art to which it appertains to make and use the same.

This invention relates to certain new and useful improvements in dust and dirt collectors and more particularly to a device for separating foreign matter from oxygen gas.

Heretofore, much difficulty has been experienced in preventing dirt particles and moisture from entering the hose and blow pipe for oxy-acetylene welding and cutting purposes and the object of my invention is to provide a simple and efficient device which will permit of the use of oxygen gas separated from all foreign substances. With the above general object in view and others that will become apparent as the nature of the invention is better understood, the invention consists in the novel form, combination and arrangement of parts hereinafter more fully described, shown in the accompanying drawings and claims.

Reference is to be had to the accompanying drawings forming a part of this specification, it being understood that the drawings are merely illustrative of one example of the invention.

Figure 1 is a longitudinal cross section.

Figure 2 is a section taken through the line 2—2 of Figure 1, and

Figure 3 is a perspective view of part of the outlet tube.

1 is the main body of my device, cylindrical in shape provided with a boss 2 connected by a neck 3 to the main body at or near the top. The top of the boss has a screw opening 4 for the reception of an oxygen supply pipe X, a bottom opening 5 for a clean-out plug 6 and an opening 7 for reaming purposes, closed normally by a screw plug 8. 9 is a plugged opening in the bottom of the body for the purpose of removing dirt, moisture, etc., after it has been withdrawn from the oxygen as hereinafter explained. A passage 10, preferably tapered, runs through the neck 3 and enters the body 1 at a tangent. The body 1 has a screw threaded opening 11 in the top to receive the separator outlet tube generally identified by 12.

The outlet tube 12, open at the top for connection with a service pipe Y, has within it near its bottom two vanes 13 and 14 crossing each other and below these vanes is a hollow conical guard 15 screwed in the bottom of the tube, having within it means 15' for screwing it into and out of engagement. Between the vanes and the conical guard are oppositely disposed walls 16 and slotted openings 16' in the sides of the tube.

The operation of the device is as follows: The conical guard 15 having been screwed in the bottom of the tube, the tube is then screwed within the body 1 by means of the threads at 11. Oxygen to be cleaned from the supply pipe X is admitted through the opening 4, passes through the tapered passage 10 of the neck 3 at a tangent and strikes with considerable velocity the circular wall of the body 1 and is given a whirling downward motion. This whirling motion alone frees the oxygen of some of its impurities but in order to completely filter the oxygen I employ further means consisting of the conical guard 15 and the vanes 13 and 14. By simply relying upon the whirling motion alone the velocity of the gas is not sufficiently diminished before entering the outlet tube to throw off all particles of foreign matter but the gas striking the walls of the openings 16 and the vanes 13 and 14 has its vortex movement completely retarded and in consequence particles of dirt, moisture. etc., are caused to drop upon the cone shaped guard and settle to the bottom of the main body. While the conical guard acts as a deflector as just described, its most important function is to catch any foreign matter that might be carried by the oxygen in its upward flow before it passes through the walled openings of the tube. It is understood that some of the oxygen in its whirling motion is carried below the bottom of the tube and then flows upward. If the oxygen had an unobstructed passage through the bottom of the tube it follows that the vanes alone would have to be depended upon to throw off the remaining impurities. But in accordance with my invention the oxygen not only receives the benefit of the whirling motion to throw off dirt particles, etc., and the benefit of the walled openings and the vanes to impede the vortex motion but also the benefit of the conical guard. After the oxygen has passed the vanes its velocity is comparatively slow and its movement practically straight upward. From a practical demonstration of the invention it has been found that by means of this combination oxygen is freed from all dirt particles and moisture and purified to such an extent as to make its use reach maximum efficiency.

From the foregoing description of the device and its operation, it is thought that it will be clearly seen that the steps taken to purify the oxygen from the time it enters the main body from the supply pipe X until it exits through the service pipe Y are as follows: first, the vortex movement of the oxygen at considerable velocity to cast off impurities; secondly, the employment of the walls of the opening and the vanes to separate the impurities from the oxygen; and, thirdly, the use of the hollow cone to throw off the impurities.

I do not wish to limit myself to any particular number of vanes or openings for the outlet tube as it will be obvious that in some instances one vane or more than two vanes may be advisable and also more than two openings.

While I have described the invention particularly adapted to the purification of oxygen gas, I wish it understood that I do not limit myself to any specific substance from which foreign matter may be separated.

What I claim is:—

1. In a device for separating foreign matter from oxygen gas, comprising a main body provided with a clean-out opening and an inlet adapted to give the oxygen a vortex movement within the body, an outlet tube extending into the body and closed at its bottom, vanes located within the said tube and walled openings in the sides of the tube between the vanes and bottom closure of the tube, said closed bottom, vanes and walled openings adapted for the purpose of arresting the vortex movement of the oxygen before it escapes through said outlet tube.

2. In a device for separating foreign matter from oxygen gas, comprising a main body provided with a clean-out opening and an inlet adapted to give the oxygen a vortex movement within the body, an outlet tube extending into the body, removable means for closing the bottom of said tube, vanes located within said tube and walled openings in the sides of the tube between the vanes and said removable means, said bottom closure, vanes and walled openings being adapted for the purpose of arresting the vortex movement of the oxygen before it escapes through said outlet tube.

3. In a device for separating foreign matter from oxygen gas, comprising a main body provided with a clean-out opening and an inlet adapted to give the oxygen a vortex movement within the body, an outlet tube extending into the body, a removable hollow cone shaped bottom closure for said tube, vanes located within said tube and walled openings in the sides of the tube between the vanes and the bottom closure, said bottom closure, vanes and walled openings being adapted for the purpose of arresting the vortex movement of the oxygen before it escapes through said outlet tube.

4. As an article of manufacture, a closed bottom outlet tube for separators of the vortex type, having vanes located within the tube near the bottom thereof and openings in the sides of the tube below the vanes.

FRANK CLARENCE HASSE.